APPARATUS FOR USE IN RECORDING DETAILS OF HEADS

Filed May 12, 1967 9 Sheets-Sheet 1

May 26, 1970 G. P. RABEY 3,514,606

APPARATUS FOR USE IN RECORDING DETAILS OF HEADS

Filed May 12, 1967 9 Sheets-Sheet 3

APPARATUS FOR USE IN RECORDING DETAILS OF HEADS

Filed May 12, 1967 9 Sheets-Sheet 5

APPARATUS FOR USE IN RECORDING DETAILS OF HEADS

Filed May 12, 1967 9 Sheets-Sheet 8

May 26, 1970 G. P. RABEY 3,514,606

APPARATUS FOR USE IN RECORDING DETAILS OF HEADS

Filed May 12, 1967 9 Sheets-Sheet 9

3,514,606
APPARATUS FOR USE IN RECORDING DETAILS OF HEADS
Graham P. Rabey, Greenbanks, Trout Rise, Loudwater, Hertfordshire, England
Filed May 12, 1967, Ser. No. 638,011
Int. Cl. G03b 41/16
U.S. Cl. 250—65 20 Claims

ABSTRACT OF THE DISCLOSURE

The invention concerns a photographic record of the head consisting of internal and external photographs all to the same scale and superimposed on a standard lattice grid. The photographs are taken in directions along three mutually perpendicular reference axes in the head. The invention is also concerned with photographic and model making units for use in preparing the record.

I find that in medicine, and the biological sciences generally, there is a real need for a standard system which can be used for identifying the internal and external parts of the body, and particularly of the head, for recordal and reference purposes and which is generally applicable, universally intelligible, and unambiguous. With such a system, accurate details of the body or head both in health and disease could be recorded, transmitted, compared, measured, and analysed. Previously no satisfactory method of reproducing the same conditions and registrations for standard measurement of the head has been available and instead, three separate and unrelated records are in common use; namely photographs of the head, X-ray radiographs of the head, and casts of the jaws. Each of these has its separate use but their value would be greatly enhanced if the records could be accurately combined to the same scale, because it would enable growth and deformities to be charted over a period of time and to be compared with similar growth and deformities in other heads in different places. It is also useful in anthropology in comparing the different head structure of different races and animals. It is especially advantageous to have information about the external configuration of the head, as shown by optical photographs, the internal configuration of the head as shown by radiographs, and the mouth configuration in the case of serious injury to a head, since all this information is needed to determine what tissue damage has occurred, how best to operate and from which direction, and what bone tissue is capable of being used as a rigid fixation for splints, appliances, and wires for use in beginning to rebuild the head or face. Although photographs, radiographs and mouth models could previously be made there has heretofore been no way of relating them accurately to one another and to exactly the same scale. The present system enables photographic and radiographic views to be taken in the same direction to be superimposed upon one another to exactly the same scale so that external and internal features can be directly related to one another without any ambiguity. To have these different views side by side on the same record medium greatly facilitates the surgeon in assessing the condition of the head.

A recording system which I have developed and which meets the above criteria, combines these three types of record in a single, standardised photographic record which has provision for accurate measurement and comparison in all three planes in space and which can be mounted on a single sheet of paper.

The system takes the cephalic axis, the mid-axial point, and the horizontal plane of the head as its registration features for the construction of the record and it takes the mid-sagittal plane, the mid-coronal plane, and the horizontal plane of the head as the registration features for the mounting of the final photographic records. The cephalic axis is the imaginary line passing through the centres of the external ear cavities of the head and the mid-axial point is the mid-point on this axis between the ear cavities. The horizontal plane of the head is the plane containing the cephalic axis and the lowest point of the intra-orbital margin (marked O on FIG. 20 of the accompanying drawings) on a chosen one of the eyes. The mid-sagittal plane is at right angles to the horizontal plane and to the cephalic axis and passes through the mid-axial point to separate the head into right and left halves. The mid-coronal plane is at right angles to the horizontal plane and intersects it along the cephalic axis.

My full system consists in taking a series of up to eighteen photographs to the same scale of the head which may be superimposed on a lattice grid. Six photographs are optical photographs showing the external apperance of the head. Six photographs are optical photographs of X-ray radiographs showing the internal structure of the head. The other six photographs are optical photographs of positive models of the upper and lower mouths. Each set of six standard photographs are taken one in each direction along each of the three mutually perpendicular axes defined by the intersections of the horizontal, the mid-sagittal, and the mid-coronal planes of the head. That is to say each set of six photographs comprises front and back views taken in the horizontal plane and perpendicularly to the cephalic axis at the mid-axial point, right and left views taken one in each direction and centered along the cephalic axis, and top and bottom views, i.e. vertico-submental and submento-vertical views, taken perpendicularly to the horizontal plane and centered on the mid-axial point. In taking the lower view of the upper mouth and the upper view of the lower mouth model it is necessary to remove the obscuring opposing model.

The six photographs of the head and the six photographs of the models are less than life size and the six X-ray radiographs are slightly larger than life size because of the diverging rays. By a method to be described the X-ray radiographs are rephotographed so that all the eighteen records are of exactly comparable dimensions suitable for accurate comparison measurement and analysis in all three planes in space. The super-position of the photographic image on a square lattice grid, the vertical and horizontal centre lines of which correspond to the positions in the head of the two planes the intersections of which define the axis along which that image was taken, is preferably produced by a double exposure photograph. The first exposure provides the image of a square lattice grid and the second exposure provides the image of the head. The lattice squares have a side corresponding to a simple distance, such as 1 cm., in the superimposed head, thus allowing accurate measurements to be made.

As well as the eighteen standard views described for all situations, there will be required special but standardised views for special circumstances and conditions as they occur. Because of the registration method outlined above it is possible to fix any position in space accurately and repeatedly by the use of the standard planes, axes and points described, and to refer to that position by simple Cartesian coordinates based on the three mutually perpendicular axes. For instance the standard view of the zygematic bone may require the head to be tilted at an intermediate angle. Internal and external views of other parts of the body, for example the chest, abdomen and lower limbs can also be taken and referred to the mid-sagittal and mid-coronal planes. This may be carried out by raising the body to the appropriate height and rotating it about the vertical axis passing through the mid-cephalic axial point perpendicular to the horizontal plane in the head, and the point of contact of the ankle bones.

My system utilizes apparatus which falls into two parts; the first is a photographic unit, and the second is a model unit.

In accordance with the first feature of the invention the photographic unit comprises an elongated frame containing an adjustable support for the subject the details of whose head are to be recorded, an adjustable head clamp including ear plugs for insertion into the outer ears of the subject's head to locate the subject relatively to a standard mid-axial point set in the unit, an X-ray machine at one end of the frame directed towards the head clamp, a removable X-ray cassette holder to the side of the clamp remote from the X-ray machine, a removable lattice grid between the cassette holder and the head clamp, a diffusing light source between the clamp and the grid, and an optical camera at the other end of the frame directed towards the clamp.

In use a succession of films in the photographic camera are exposed to the lattice grid illuminated by the diffusing light source and the exposed films are stored for later re-exposure. X-ray cassettes are placed in the holder and with the holder and grid, but not the light source, in position behind the clamp X-ray radiographs are taken of the head in the six different positions. The lines of the lattice grid may be radio-opaque in which case the radiographs will show the lattice superimposed on the radiograph image but preferably the lattice grid is provided by a photo-opaque and radio-lucent sheet with photo-lucent grid lines and a central radio-opaque cross coincident with central horizontal and vertical lines of the photo-lucent grid. This produces a central cross on each radiograph the vertical and horizontal lines of the cross representing the two planes in the head the intersection of which defines the axis along which that image of the head was taken. This cross can be used to centralise the radiograph for subsequent photography which is preferably carried out by locating the radiograph in position on a diffusing screen of the light source, with the radiograph cross in alignment with the tips of the cross on the screen and then re-exposing in the optical camera, one of the films which has been exposed to the grid, to the illuminated radiograph. The X-ray cassette and holder and the grip are then removed and the six external photographs of the head are then taken by the optical camera as second exposures on films which have already been exposed to the grid. This process is repeated to produce optical photographs of the mouth models which are supported in the head clamp of the unit in exactly the same position relatively to the mid-axial point in the head clamp as that which they occupy in a head properly supported in the head clamp.

The model unit is used in the construction of positive models of the upper and lower mouths relatively to the horizontal plane of the head, the cephalic axis, and the mid-axial point. The model unit comprises at least four separate pieces; a face bow, a model maker, and model bases, two for each subject.

In accordance with a second independent feature of the invention, the face bow comprises a pair of plugs for insertion in the outer ears of the head of a subject and adjustable with a parallel motion towards and away from one another, at least one of the plugs being rigidly connected to a side piece having a straight edge extending from the centre of the plug so that the face bow can be swung about the subject's cephalic axis until this edge is in horizontal alignment with the orbitale point, and an adjustable bite piece which can be gripped between the teeth and then clamped in position relatively to the side pieces and ear plugs. The model maker comprises a stand having two oppositely directed holes representing external ears for locating the ear plugs for the face bow, a guide surface for engaging and locating the straight edge of the face bow when it is swung about the plugs in the holes of the model maker, and mountings for locating two model bases in predetermined positions on the model maker. The model bases each consist of a plate with a complementary mounting for engagement with one of the mountings on the model maker to hold the model base in a predetermined position on the model maker, and a portion for positively keying a plaster case of the upper or lower mouth of the subject of the plate.

In use the face bow is first applied to the subject's face to provide a record of the three dimensional relationship between the subject's jaws and the reference features in the head. Positive models of the upper and lower jaws are then made by conventional dental techniques and are secured to model bases carried by the model maker in relative positions determined by the position of the bite piece of the face bow which is located on the model maker. The positive models are thus mounted in exactly the same positions relatively to the planes, axes and point representing the reference features in the head, as they actually occupy in the head. The upper and lower models, fixed to their model base plates, are then photographically recorded in the photographic unit by means of a model holder. This is a piece of apparatus similar in design to the model maker, and indeed in certain cases the model maker itself may be used as a model holder, with mountings for the model base plates with the models attached. The model holder is arranged to be locked in the standard positions in the head clamp of the photograph unit corresponding to the positions of the subject's head in the previous set of optical photographs. Six optical photographs with the superimposed lattice grid are made of the models by the previously described method.

Examples of photographic and model units constructed in accordance with the invention and their use in the production of my novel head structure record are illustrated in the accompanying drawings in which.

Figures 1, 2, 3:
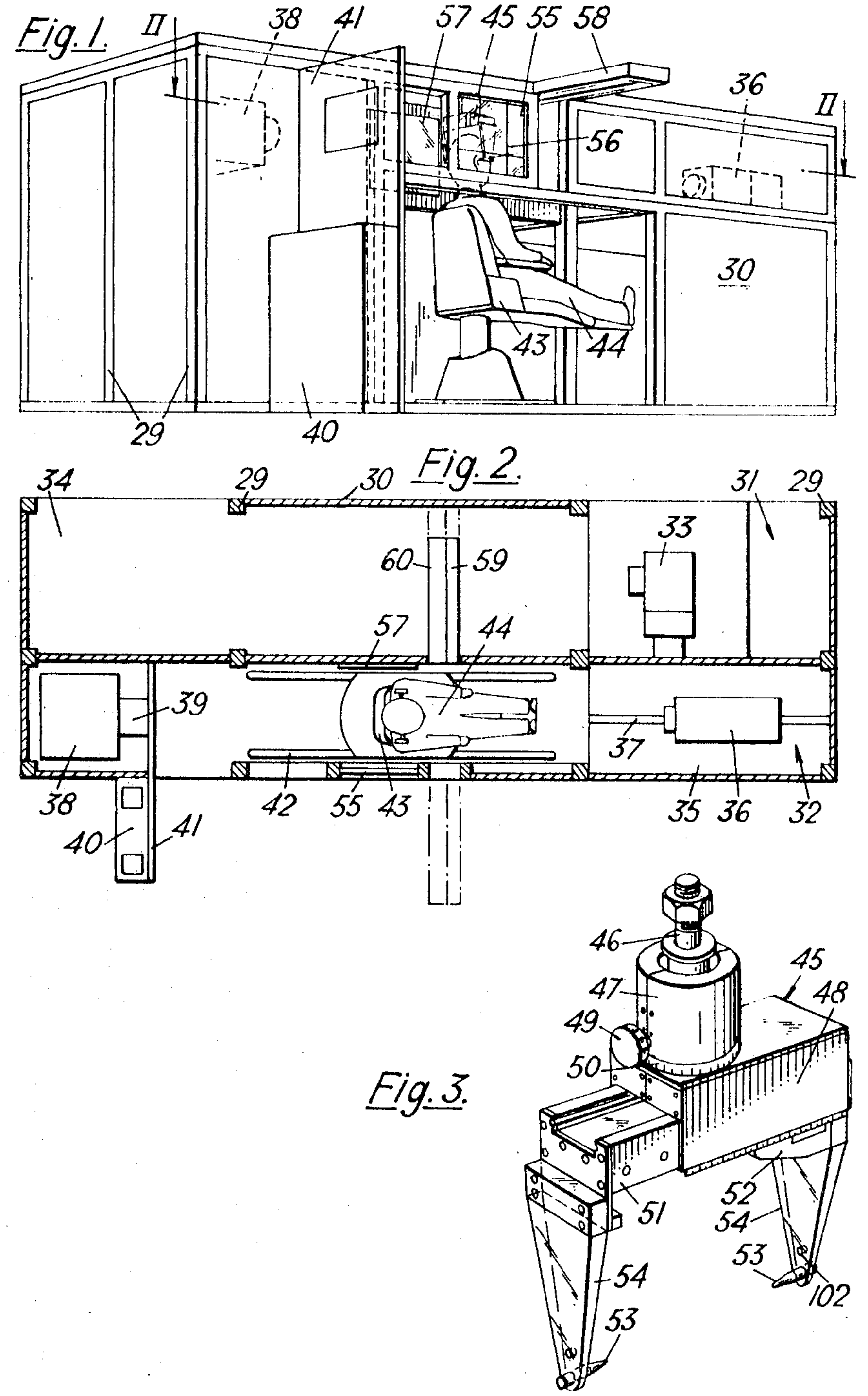
FIG. 1 is a perspective view of the photographic unit.
FIG. 2 is a section taken on the line II—II in FIG. 1.
FIG. 3 is a perspective view of the head clamp in the photographic unit.
Figure 4:
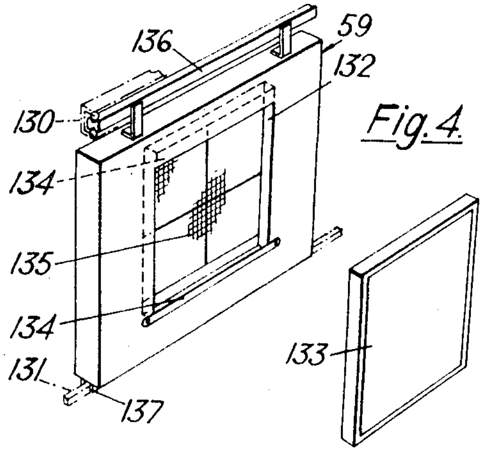
FIG. 4 is a perspective view of the cassette holder as seen from the side nearer to the optical camera.
Figure 5:
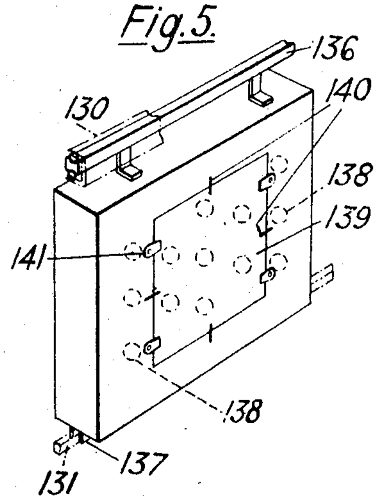
FIG. 5 is a perspective view of the diffusing light box as seen from the side nearer to the optical camera.

The photographic unit, which is illustrated in FIGS. 1 to 5, is constructed as an aluminium frame 29 clad with blockboard panels 30. The unit is divided into two sections 31 and 32. The section 31 includes a pivoted camera 33 of the rapid developing Polaroid type. This camera can be used in conjunction with a microscope for photomicrography, with an illuminated base board diffuser for photographing records such as chromosome reports and hand prints, and with retractable floodlights for photographing elevations of a human body standing at the end 34 of the section 31. This section 31 has little relevance to the present invention and will not be described further.

The section 32 includes at one end a lightproof tunnel 35 containing an optical camera 36 which is able to slide along the tunnel between two limiting positions on a guide rail 37. The camera 36 uses a Repro Claron 420 mm. lens and the camera back and film are of the rapid developing Polaroid type. When the camera is slid from one position to the other, for a purpose to be described later, the only other operation required is to turn a knob beneath the image plane of the camera which changes its position to focus for the two lens positions. All other camera factors have been standardised so that no adjustments are necessary for aperture or speed.

At the other end of the section 32 is an X-ray machine 38 having a tube, high tension transformer, and rectifier unit all enclosed in a lead cubicle from which emerging X-rays pass through a narrow aperture 39 controlled by a diaphragm. A control cabinet 40 is mounted behind a separate screen 41 having a window.

The generator has an output of 125 kv. and 300 ma. The control cabinet incorporates an electronic timer with forty selections, and pre-reading current scales, voltage scales and exposure current scales. There is also a six point technique selector defining focal size for tube current. Switches are provided for two Bucky diaphragms and a single plate film changer. The high tension transformer is fully rectified with selenium rectifiers. The tube is a double focus rotating anode with a heavy tungsten disc anode.

Mounted on the floor on guide rails 42 in the centre of the section 32 is an adjustable and rotatable chair 43. This chair is arranged to support a subject 44 with his head located in a head clamp 45 which is suspended from the top of the unit. This head clamp is shown in detail in FIG. 3 and includes a rigid supporting bolt 46 on which a bearing housing 47 is mounted. Rotatably mounted about the vertical axis of the bolt 46 on the bearing in the housing 47 is a block 48 which can be clamped against rotation by a knob 49 and which carries a scale 50 indicating the angular rotation of the block 48 from a datum position. Spring catches are provided at 90 degree intervals. Two supports 51 and 52, which carry a pair of coaxial radio-opaque ear plugs 53 on downwardly depending side pieces 54, are guided in the block 48 by linear bearings so that they slide horizontally and parallel both to one another and to the common axis of the ear plugs 53. Each of the supports 51 and 52 carries a rack which meshes with the opposite side of a pinion which is rotatable on a fixed axis in the block 48. The racks and pinion constrain the supports 51 and 52, and hence the ear plugs 53 to move in equal and opposite directions relatively to the vertical axis of the bolt 46 so that the centre point between the tips of the ear plugs 53 is always immediately beneath the axis of the bolt 46 irrespective of the size of a subject's head in the clamp. This centre point between the ear plugs 53 is also in a direct line between the axis of the optical camera 36 and of the emergent rays from the X-ray machine 38. The catches at 90 degrees locate the cephalic axis defined by the ear plugs 53 in positions parallel and perpendicular to the length of the section 32. The head of the subject 44 is fitted into the head clamp 45 by pulling the side pieces 54 of the head clamp apart and then moving them together again so that the ear plugs 53 enter the subjects outer ears.

Incorporated in one side of the section 32 opposite the head clamp 45 is a transparent window 55 marked with a cross the vertical and horizontal arms of which intersect at a point in alignment with the cephalic axis of the head clamp 45 when this axis is perpendicular to the length of the section 32. On the othe side of the section 32, that is on the other side of the head clamp 45 from the window 55 is a plane mirror 57, the cross 56 and mirror 57 enabling a subject's head to be lined up for recordal as explained later.

To the side of the head clamp 45 nearer to the camera 36 is mounted a transverse carrier 58 fitted with two sets of upper and lower parallel guide tracks 130 and 131 along which an X-ray cassette holder 59 and a diffusing light box 60 can slide between operative positions within the section 32 and inoperative positions either within the section 31 or outside the section 32 for adjustment. In each case the upper guide track 131 is a channel forming the outer race of a linear ball bearing the inner race of which is formed by a profiled bar 136 mounted along the top of the holder 59 or box 60. Similarly the lower guide track 131 in each case is a bar which locates a complementary channel 137 along the bottom of the holder 59 or box 60. The cassette holder 59 is made of perspex and has a central housing 132 in which an X-ray film cassette 133 can be inserted and retained by upper and lower strips 134. The face of the housing nearer to the box 60 incorporates a central perspex sheet 135 incorporating a 1.1 centimetre square lattice grid white on black and radiolucent with central, vertical and horizontal centre lines thicker than the rest. These centre lines incoporate radio-opaque wires in the form of a cross. The centre point of this cross and therefore of the lattice grid, is in horizontal alignment with the mid-cephalic axial point of the head clamp. A strip along the bottom of the grid is transparent to enable labelling to be carried out simultaneously with all the records by using photo-opaque and radio-opaque letters.

The light diffusing box 60 is hollow and incorporates electric lamps 138 and at the centre of its face nearer to the holder 59 there is a light diffusing frosted perspex screen 139. At the top and bottom and at each side of the screen are marked tips 140 of a cross in alignment with the arms of the central cross on the rear face of the holder 59. Four spring or rotary clips 141 are provided at the edge of the screen 139.

Figure 6:
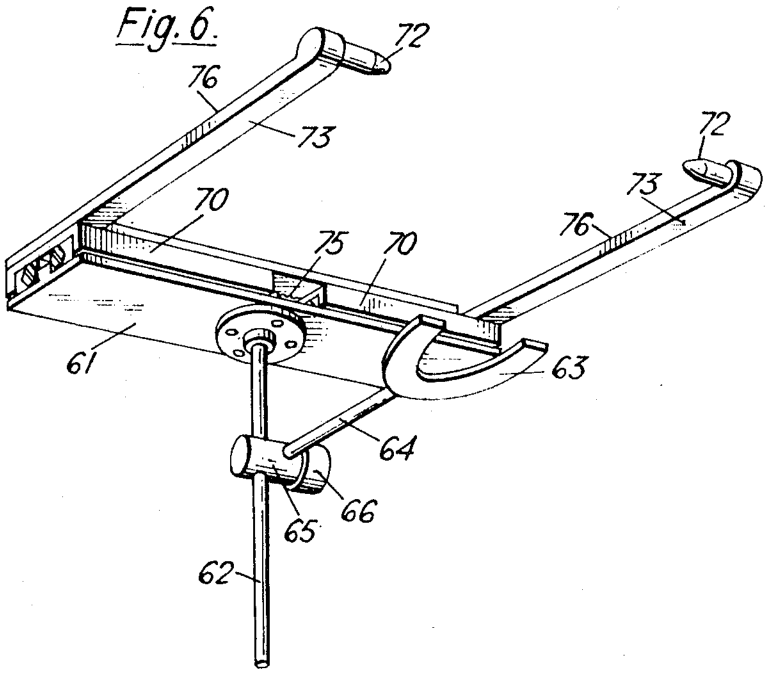
FIG. 6 is a perspective view of the face bow.
Figure 7:
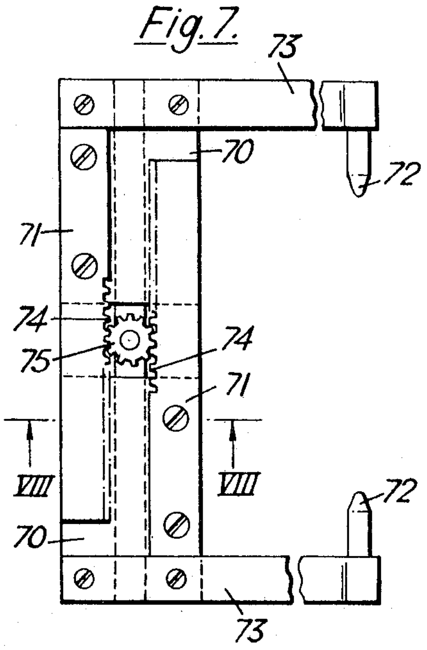
FIG. 7 is a plan of the face bow.
Figure 8:
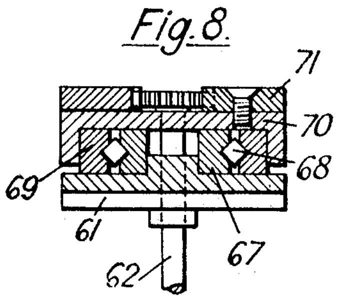
FIG. 8 is a section taken on the line VIII—VIII in FIG. 6.

The model unit incorporates a face bow, at least two model bases, and a model maker. The face bow is shown particularly in FIGS. 6 to 9 and incorporates a base plate 61 from which a spindle 62 rigidly depends. A malleable bite piece 63 is carried from the spindle 62 by another spindle 64 and a universal joint 65 which is shown diagrammatically in FIG. 6 and can be loosed and clamped tight by means of a knob 66. At each end the base plate 61 carries the inner race 67 of a linear roller bearing 68 the outer race 69 of which is fixed to a channel section 70 carrying a strip plate 71. The two channels 70 and plates 71 are therefore slidable to and fro along the base plate 61 to bring a pair of co-axial ear plugs 72, which are carried from the channel pieces 70 by side pieces 73, towards or away from one another along their common axis. The plates 71 each carry a rack 74 and these racks mesh with opposite sides of a pinion 75 which is freely rotatable on the base plate 61. This co-operation between the racks and pinion constrain the plates 71, and hence the ear plugs 72 to move towards and away from one another by equal and opposite amounts so that the mid-point between the ear plugs 72 is always opposite the centre of the base plate 61. This arrangement is the same as that in which the ear plugs 53 are mounted.

The ear plugs 72 are slightly offset above the ends of the side pieces 73 and the upper surfaces 76 of the side pieces 73 are coplanar, their common plane containing the common axis of the ear plugs 72.

Figure 9:
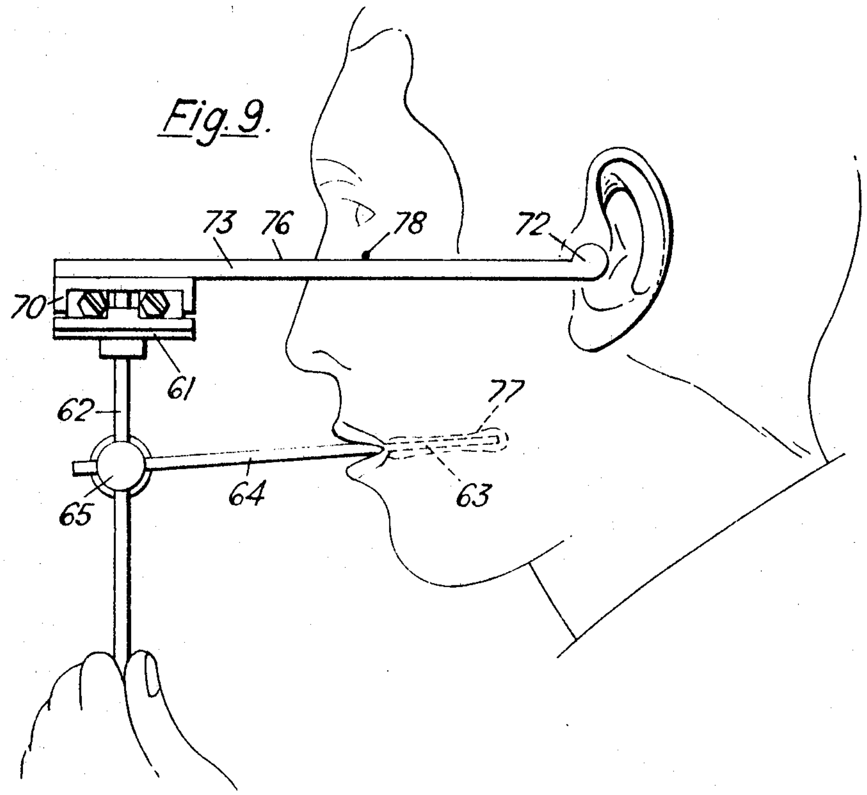
FIG. 9 is a perspective view of the face bow in use.

The face bow is used during preparation of the upper and lower positive mouth casts for recording the position of the subject's jaws relatively to the horizontal plane and the cephalic axis and its mid-point, providing the reference features in the subject's head. This use of the face bow is shown in FIG. 9. The bite plate 63 is covered with soft wax 77 and gripped between the subject's teeth. The side pieces 73 are pulled apart and then closed together again with the ear plugs 72 in the subject's outer ears. The universal joint 65 is loosed and the face bow manipulated until the straight edge 76 of the left hand side piece 73 is sighted in horizontal alignment with the right hand side piece 76 and with the subject's left orbitale point which has previously been marked with a spot 78. The joint 65 is then clamped tight and the face bow is removed from the subject's head. The face bow then provides an accurate record of the subject's bite relatively to the reference features in his head. A squash bite impression of the subject's dental arches together is also made, without the face bow in position.

Figure 10:
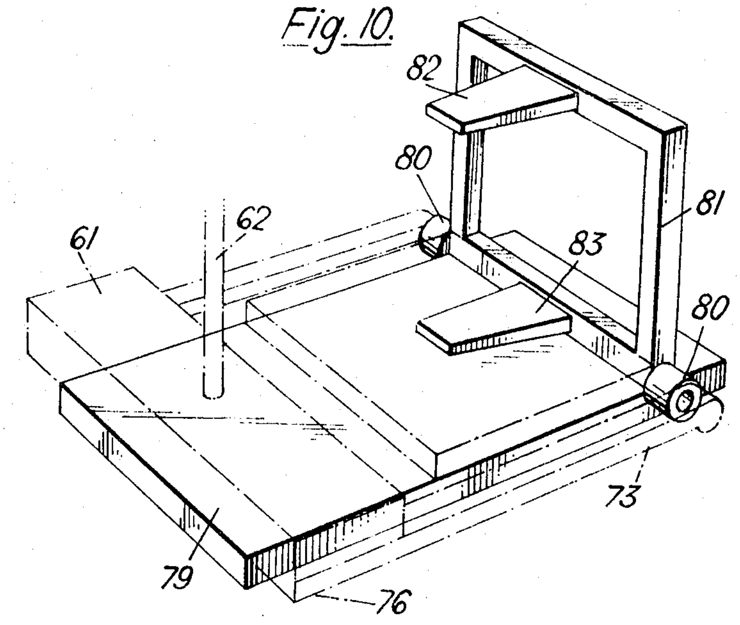
FIG. 10 is a perspective view of the model maker with the face bow shown in phantom lines located on it.
Figures 11, 12, 13, 14, 15:
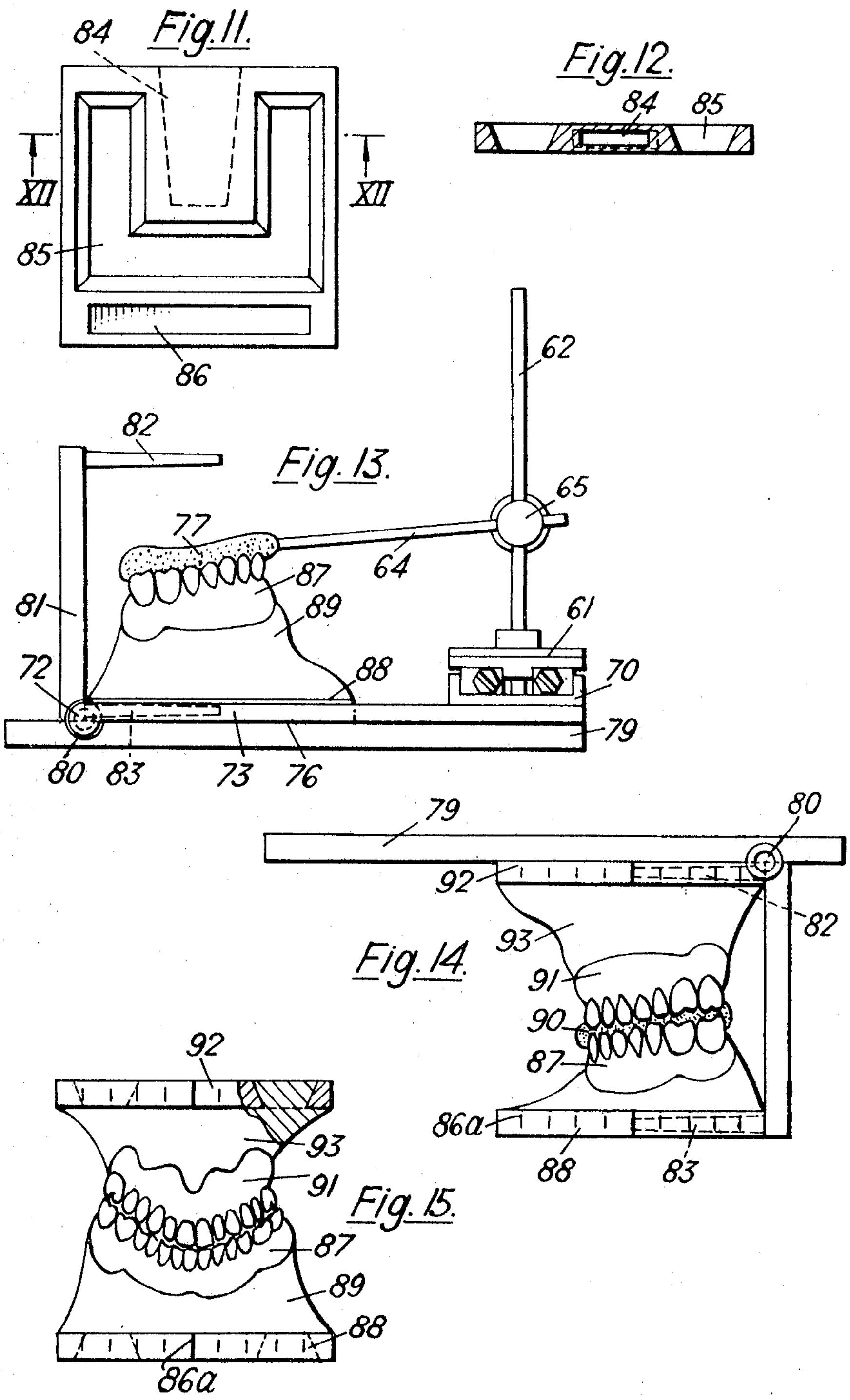
FIG. 11 is a plan of a model base.
FIG. 12 is a section taken on the line XII—XII in FIG. 11.
FIG. 13 is a side elevation showing the preparation of an upper mouth model.
FIG. 14 is a view similar to FIG. 13 but showing the completed upper and lower mouth models.
FIG. 15 is a front view of the upper and lower mouth models.

Positive casts of the subject's upper and lower mouths are produced from impressions by normal dental techniques. The constructions of models of the upper and lower mouths from these casts suitable for photographing is carried out on the model maker which is shown in FIGS. 10, 13 and 14. The model maker comprises a rectangular block 79 the surface which is shown uppermost in FIG. 10 representing the horizontal plane in the head. At one end of the block 79 is a pair of oppositely facing integral coaxial tubular spigots 80 the common axis of which is in alignment with the upper surface of the block 79 and which represents the cephalic axis in the head and the mid-point between which represents the mid-axial point in the head. These spigots are intended to receive the ear plugs 72 of the face bow which is shown in FIG. 10 inverted in position on the model maker with the surfaces 76 coplanar with the upper flat surface of the block 79. Projecting upwards between the spigots 80 is a square frame 81 the front surface of which intersects the upper surface of the block 79 at the cephalic axis and which is formed integrally with two projecting wedge shaped tongues 82 and 83. These tongues 82 and 83 are each arranged to carry a model base, one of which is shown in FIGS. 11 and 12. This base is a 10 cm. square integral plastic moulding formed with a wedge shaped recess 84, an undercut U-shaped keying slot 85, and a labelling strip 86. Centimetre graduations 86*a* are marked along each side of the base. The model base fits onto one of the wedge shaped tongues 82 or 83 of the model maker, the tongue being received as a close fit within the recess 84. The remote edges of the two bases are then 10 cms. aparts so that the bases form two sides of a 10 cm. cube.

FIGS. 13 to 15 show the prepartion of the models. FIG. 13 illustrates the face bow in its inverted position on the model maker as in FIG. 10 but with an inverted positive model 87 of the subject's upper mouth located in position. This is done by sticking the cast 87 with hot wax against the wax impression 77 on the bite piece 63 of the face bow and securing the cast 87 to one of the model bases 88, which is fitted on the wedge tongue 83, by plaster of paris 89 which keys into the slot 85 in the model base 88. The face bow is then removed and the previously prepared squash bite impression is located on the teeth of the inverted upper mouth cast 87. A positive cast 91 of the subject's lower mouth is then located on the squash bite impression 90 and is keyed to another model base 92, fitted on the wedge tongue 82, by further plaster of paris 93. The models on the model maker, are then inverted to their normal position as shown in FIG. 14. The mouth casts in these mouth models will then be located in exactly the same positions relatively to the horizontal plane in the head, as represented by the surface of the block 79 shown lowermost in FIG. 14, and to the cephalic axis of the head, as represented by the common axis of the spigots 80, as they were in the subject's own head. The cephalic axis then forms one edge of the 10 cm. cube defined by the two model bases with the mid-cephalic axial point mid-way along that edge.

FIG. 15 shows the upper and lower mouth models after removal from the model maker and without the squash bite impression 90. The models may be supported by any sort of holder, similar to the framework 81 of the model maker, having a pair of wedge shaped tongues at appropriate spacings for receiving the model base which carry the upper and lower mouth models. This model holder may be constructed as an articulater and incorporate a hinge, such as an integral film hinge when the holder is moulded from polypropylene, enabling the upper mouth model to be swung upwards away from the lower mouth model for inspection of their internal features. The centimetre graduations on the model bases and similar graduations extending perpendicularly between the model bases on the model holder enable any part of the model to be referred to by three Cartesion co-ordinates with the mid-cephalic axial point as origin.

Figures 16, 17, 18, 19, 20:
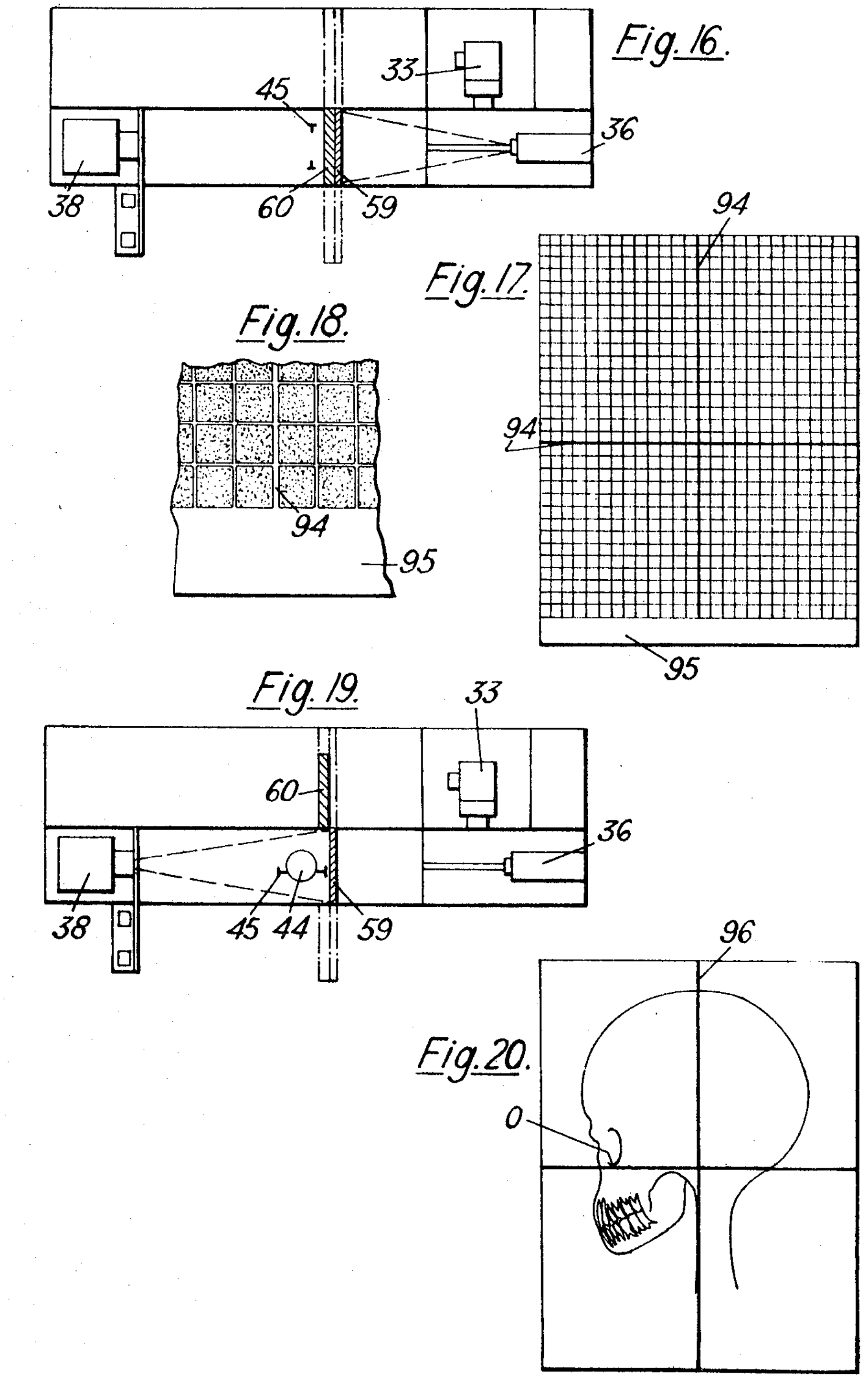
FIG. 16 is a schematic plan of the photographic unit showing exposure of the optical film to the grid.
FIG. 17 is a resulting negative of the grid.
FIG. 18 is a detailed close-up of a print of part of the grid negative shown in FIG. 17.
FIG. 19 is a schematic plan showing the production of the radiographs.
FIG. 20 shows a resulting radiograph.

The preparation of the photographic records of the head, using the photographic unit and the mouth models prepared on the model unit, is illustrated in FIGS. 16 to 23. First of all, without the subject being necessarily in position in the photographic unit eighteen exposures are made of the lattice grid using the optical camera 36 in its retracted position. This is shown in FIG. 16 where it will be seen that both the light box 60 and the cassette holder 59 are in their operative positions, although no X-ray cassette 133 is in the housing 132 of the holder 59 and an image of the grid is taken. This is repeated eighteen times. Although the exposure of the grid is not developed at this stage, a negative of the image, if it were developed, is shown in FIG. 17. It will be ssen that the lattice grid is a square lattice, the central vertical and horizontal lines 94 being thicker than the rest to provide central reference axes. The labelling space 95 at the bottom of the grid is also shown. FIG. 18 shows part of a would-be print from the lower central portion of the would-be negative of FIG. 15 indicating that the developed and printed exposure of the grid produces a grid which is white on black.

FIG. 19 illustrates the preparation of the radiographs of the subject's head. For this purpose the light box 60 is moved to an inoperative position and the cassette holder 59 is placed in its operative position and containing an X-ray cassette 133. One exposure is taken as seen in the direction from left to right along the subject's cephalic axis with the nominal horizontal plane of the head truly horizontal. This is ensured by tilting the subject's head about the head clamp until the orbitale point, marked with a spot as shown at 78 in FIG. 9, is sighted in register with a horizontal arm of the cross 56 on the window 55 and with the reflection of this horizontal arm in the mirror 57. This is shown in FIG. 19 and the resulting radiograph is shown in FIG. 20 with the superimposed cross 96 produced by the radio-opaque cross in the cassette holder 59. The centre point of this cross 96 is at the subject's cephalic axis, the horizontal arms of the cross represent the horizontal plane of the head and the vertical arms of the cross represent the subject's mid-coronal plane. A second exposure is taken as seen in the other direction along the cephalic axis. This is done by rotating the chair 43 and the head clamp 45 through 180 degrees until the head clamp catch 180 degrees from the original position is reached.

A third exposure is taken with the subject's head facing the X-ray unit 38. In this exposure the cephalic axis of the head clamp 45 will be located transversely to the length of the apparatus and the subject's head will be tilted about the head clamp until the orbitale point is sighted in register with a horiontal arm of the cross 56 and its reflection again. A fourth exposure is taken facing in the other direction, that is the direction shown occupied by the subject in FIGS. 1 and 2 of the drawings. In these third and fourth exposures the vertical and horizontal arms of the cross 96 on the radiographs will represent the subject's mid-sagittal and horizontal planes.

The chair 43 is then adjusted to allow the subject to tilt his head backwards from the position shown in FIGS. 1 and 2, without disturbing the head clamp, until the subject's orbitale point is sighted between the vertical arm of the cross 56 and its reflection in the mirror 57. A fifth exposure is taken in this position. The subject and head clamp are then rotated through 180 degrees about the vertical axis and the subject's head is again tilted backwards until his orbitale point is sighted between the vertical arm of the cross 56 and its reflection in the mirror 57. A sixth exposure is taken in this position. The six exposures are then developed to form negative radiographs.

Figures 21, 22:
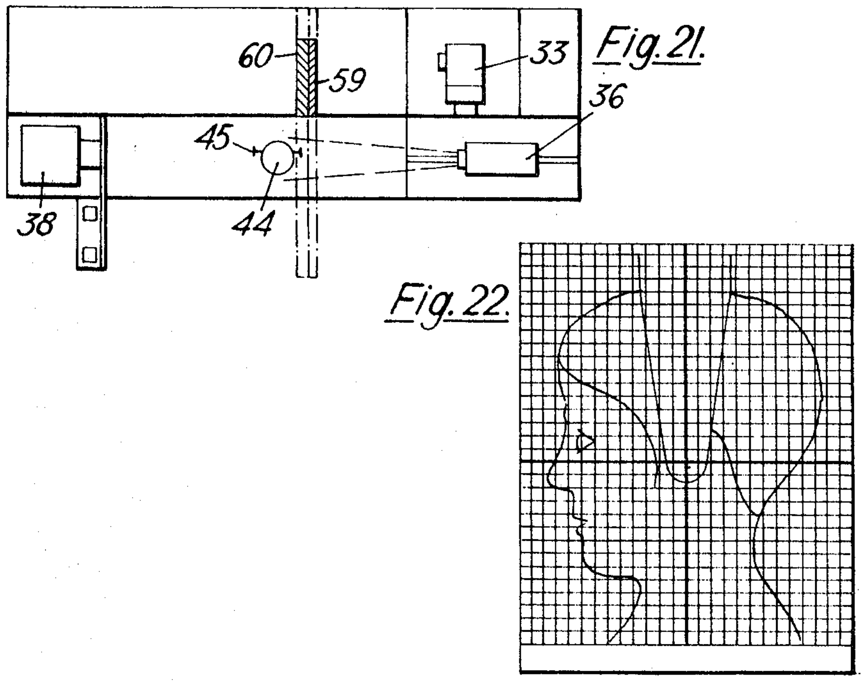
FIG. 21 is a schematic plan of the photographic unit showing the optical photography of the head.
FIG. 22 shows the resulting photograph of the head superimposed on the lattice grid.

Six similar optical exposures are then taken of the subject's head illuminated by a circular floodlight which surrounds the lens axis of the camera 36 in the tunnel 35. The optical camera is used as shown in FIG. 21 with the box 60 and holder 59 in their inoperative positions and the camera 36 in its forward position. The six exposures are taken as double exposures on film which has already been exposed to the lattice grid as described. One resulting print of the external features of a subject's head superimposed on the lattice grid, with the centre point of the grid coincidental with the subject's cephalic axis, and the horizontal and vertical centre lines of the grid coincidental with the subject's horizontal and mid-coronal planes, is shown in FIG. 22.

Figures 23, 24:
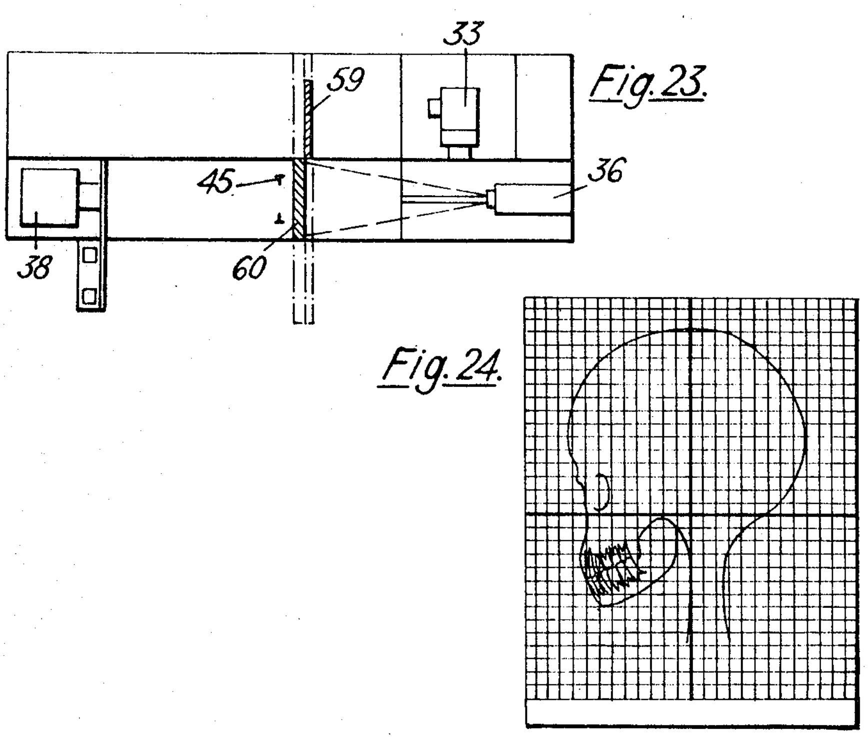
FIG. 23 is a schematic plan of the photographic unit showing the photography of the radiographs.
FIG. 24 shows the resulting photograph of the radiograph superimposed on the lattice grid.

The subject is now removed from the apparatus and FIG. 23 illustrates the photographing of the radiographs which have been previously prepared. With the cassette holder 59 in its inoperative position, the six radiographs are in turn each located on the front of the illuminated box 60 by the clips 141 and centralised in position by aligning the central cross 96 on the radiograph with the tips 140 of the cross at the edges of the screen 139 of the box 60. Optical photographs are now taken of the illuminated radiographs in turn using the camera 36 in its retracted position, the exposures being double exposures on film already exposed to the lattice grid. The result of photographing the radiograph of FIG. 20 is shown in FIG. 24.

Figures 25, 26:
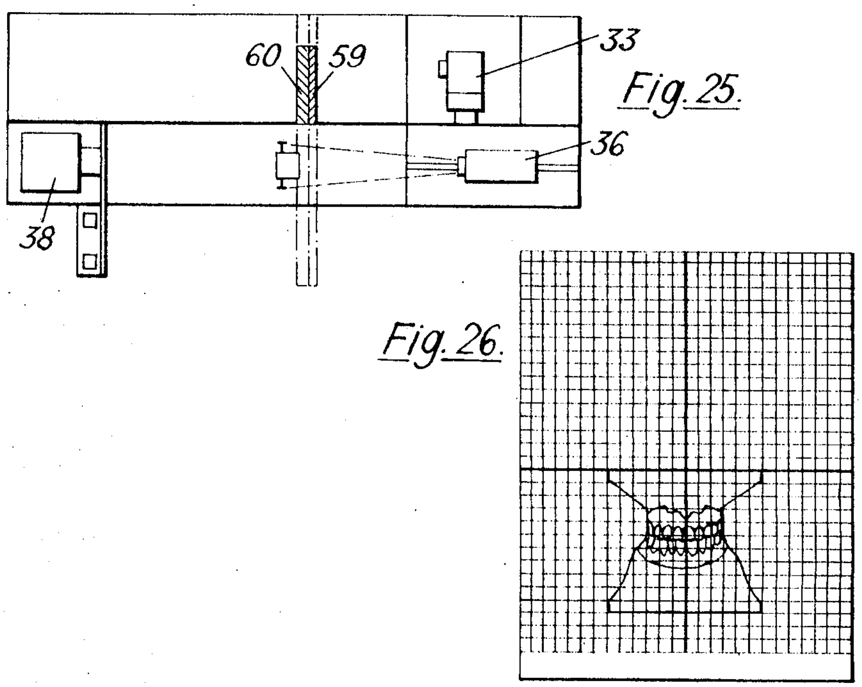
FIG. 25 is a schematic plan of the photographic unit showing the photography of the mouth models.
FIG. 26 shows the resulting photograph of the mouth models superimposed on a lattice grid.
Figure 27:
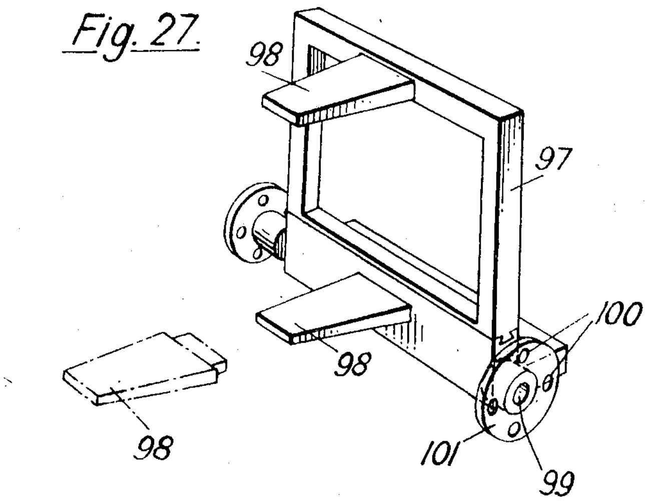
FIG. 27 is a perspective view of the model holder.

Finally six optical photographs of the mouth models are taken as shown in FIG. 25 with the optical camera 36 in its forward position and with the box 60 and holder 59 in their inoperative positions. In order to photograph the mouth models, the models are supported on a type of model holder shown in FIG. 27. Like the model maker, this has a square but removable frame 97 with a pair of wedge shaped tongues 98 the lower which is in this case independently removable. At the bottom of the frame 97 are a pair of oppositely directed tubular spigots 99 the common axis of which is in register with the front of the frame 97 and represents the cephalic axis. The plane containing this axis perpendicular to the height of the frame 97 represents the horizontal plane of the head and when the mouth models 87 and 91 are mounted on this model holder they occupy exactly the same relative positions to the representative cephalic axis and the horizontal plane of the model holder as they did in the original subject's head. The front rear and side views of the mouth models are taken with both the models on the holder which is located in the head clamp with the ear plugs 53 of the head clamp in the spigots 99. Four spring catches 100, formed in annular discs 101 surrounding each spigot 99, co-operate with recesses 102 (FIG. 3) in the side pieces 54 of the head clamp 45 to locate the nominal horizontal plane of the model holder truly vertical or truly horizontal. The lower and upper views of the upper and lower mouth models are taken after removing the lower mouth model on its wedge tongue 98, and the upper mouth model on its wedge tongue 98 together with the frame 97, respectively from the model holder. These photographs of the mouth models are also second exposures of film already exposed to the lattice grid so that the resulting photograph of, in this case, the front view of the mouth models, is shown in FIG. 26.

Figure 28:
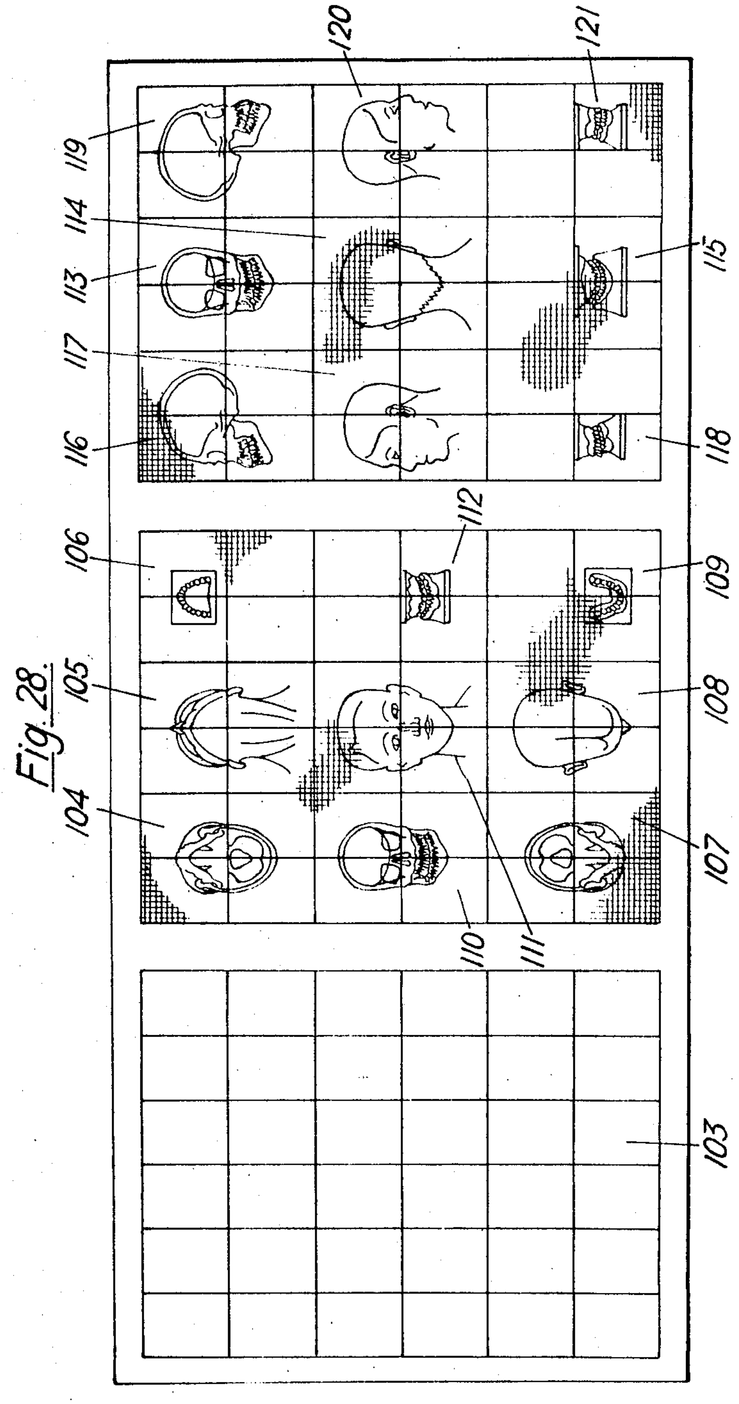
FIG. 28 is a view of a record sheet for mounting the eighteen photographs of the head record.

The eighteen photographs are mounted on a record card as shown in FIG. 28 which has eighteen spaces appropriately marked together with a page 103 for corresponding notes or non-standard views numbered 104, 105 and 106 show the internal structure of the head, the external structure of the head, and the external structure of the upper mouth all as seen from below along the axis defined by the intersection of the mid-coronal and mid-saggittal planes of the head. Views 107, 108 and 109 are similar views but taken in the other direction along the same axis and of the lower mouth model rather than the upper mouth model. The views 110, 111 and 112 are front views taken along the axis defined by the intersection of the mid-sagittal and horizontal planes of the head showing the internal structure of the head, the external structure of the head, and the mouth models. Views 113, 114 and 115 are similar views but as seen in the opposite direction along this axis. Views 116, 117 and 118 are taken from left to right along the cephalic axis, that is the intersection of the mid-coronal and horizontal planes of the head, showing the internal structure of the head, the external structure of the head and the mouth models. Views 119, 120 and 121 are similar views taken in the other direction along this cephalic axis.

Every one of the eighteen views is taken to the same scale and superimposed on a grid of the same scale. This enables any point in the head to be referred to using three dimensional Cartesian co-ordinates of which the separation of the grid lines represents one unit. Each unit represents one centimetre in actual size in the head. This follows because in the preparation of the radiographs as shown in FIG. 19, there is a ten percent increase in size from the subject's head to the latent image in the X-ray cassette at the plane of the holder 59, owing to the divergence of the X-rays. Since the radiographs are subsequently rephotographed in substantially the same plane as that in which the photographs of the lattice grid were taken, this accounts for the actual size of the lattice grid being 1.1 centimetre square. The co-ordination of the scales of all the photographs is ensured since, as will be seen from FIGS. 16, 21, 23 and 25, all photographs taken of objects at the common plane of contact of the box 60 and holder 59 are taken with the camera 36 in its retracted position whereas all photographs of objects at the head clamp are taken with camera 36 in its forward position.

Apart from their use as described for photographic records, the models of the mouth are available for direct study and comparison with other models and for the manufacture of an appliance such as splints. The photographic records can be analysed in other ways and composite superimposed photographs may in some circumstances be useful.

Figure 29:
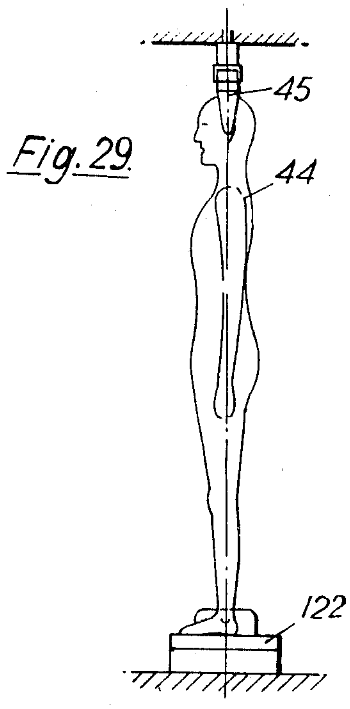
FIG. 29 is a schematic side elevation showing an alternative form of photographic unit with a standing platform for the subject; and, FIG. 30 is a perspective view of the platform shown in FIG. 29.
Figure 30:
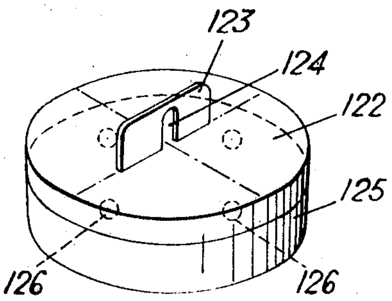

FIGS. 29 and 30 illustrate a modification to the photographic unit as shown in FIGS. 1 and 2, wherein the chair 43 is replaced by a platform 122. This platform is adjustable to accommodate subjects of different heights who will stand on the platform 122 with their outer ears located with the ear plugs of the head clamp 45. The platform 122 has an upstanding central plate 123 with a slot 124 through which the subject's inner angle bones will touch one another to locate the subject's feet accurately in position. The platform 122 is rotatable on a base 125 and spring catches 126 are provided at 90 degree intervals to locate the subject in positions facing transversely and along the section 31 of the apparatus. As well as being vertically adjustable relatively to the head clamp 45, the platform 122 and its base 125 can be jacked up together with the head clamp 45, so that internal and external photographs can be taken at different levels of the subject's body in directions parallel to the axes in the head defined by the intersection of the mid-sagittal and horizontal planes of the head and the mid-coronal and horizontal planes of the head.

What is claimed is:

1. A method of recording the condition of a human head which comprises the steps of preparing permanent photographic images to the same scale of the internal and external structure of the head as seen in directions along the three mutually perpendicular axes defined by the intersection of the mid-sagittal, the mid-coronal, and the horizontal planes of the head and superimposing said images on a lattice grid.

2. The method claimed in claim 1, in which each image is superimposed on a square lattice grid the vertical and horizontal center lines of which correspond to the positions in the head of the two planes the intersection of which define the axis along which that image was taken.

3. The method claimed in claim 2, in which each image is formed by a double exposed photograph, the first exposure providing the image of a square lattice grid and the second exposure providing the image of the head.

4. The method claimed in claim 1 in which the internal head structure image is produced by photographing a radiograph of the head.

5. The method claimed in claim 1 in which the external images include photographs of mouth models of the head.

6. The method claimed in claim 1 which comprises the steps of preparing three sets of six images, one set showing the internal structure of the head, one set of images showing the external structure of the head, and one st showing the structure of mouth models, and each set of images consisting of six images one taken in each direction along each of the three mutually perpendicular axes.

7. A photographic unit for use in producing a record according to any one of the preceding claims, the units comprising an elongated frame containing an adjustable support for the subject the details of whose head are to be recorded, an adjustable head clamp including ear plugs for insertion into the outer ears of the subject's head to locate the subject relatively to a standard mid-axial point set in the unit, an X-ray machine at one end of the frame directed towards the head clamp, a removable X-ray cassette holder to the side of the clamp remote from the X-ray machine, a removable lattice grid between the cassette holder and the head clamp, a removable illuminated diffusing light source between the clamp and the grid, and an optical camera at the other end of the frame directed towards the clamp.

8. A photographic unit according to claim 7, in which the lattice grid is provided by a photo-opaque and radio-lucent sheet with photo-lucent grid lines and a central radio-opaque cross coincident with central horizontal and vertical lines of the photo-lucent grid.

9. A photographic unit according to claim 8, in which the diffusing light source has a diffusion screen which is marked with the tips of a central cross for locating a radiograph centrally in the screen for photographing and means are associated with the screen for locating such a radiograph in position on the screen.

10. A photographic unit according to claim 7, in which the X-ray cassette holder, the lattice grid, and the digusing light source are slidable on guides transverse to the length of the unit between on operative position between the photographic camera and the head clamp, and an inoperative position.

11. A photographic unit according to claim 7, in which the head clamp is rotatable about a vertical axis through the mid-point between its ear plugs and catches are provided for locating the head clamp in the four positions in which the cephalic axis defined by the ear plugs is parallel to and perpendicular to the longitudinal axis of the photographic unit.

12. A photographic unit according to claim 7, in which the frame supports at one side of the head clamp an inwardly facing plane mirror and on the other side of the head clamp opposite to the mirror a window provided with a cross the centre of which lies on the cephalic axis of the head clamp when this axis is transverse to the length of the frame and the arms of which are vertical and horizontal; whereby a subject's head located in the head clamp can be swung about its cephalic axis between a position in which the nominal horizontal plane of the head is in the horizontal plane defined by the horizontal arms of the cross and their reflection in the mirror and a position in which it is in the vertical plane defined by the vertical arms of the cross and their reflection in the mirror.

13. A photographic unit according to claim 7, in which the support is a standing platform with means for locating the contact points of the subject's inner ankle bones in the vertical axis passing through the mid-axial point of the heal clamp, the platform together with the head clamp being vertically adjustable so that internal and external images of the structure of a subject's trunk, abdomen and lower limbs can be prepared as seen along horizontal directions in the mid-sagittal and mid-coronal planes.

14. A face bow for use in constructing mouth models for external photography in a unit according to claim 7, the face bow comprising a pair of plugs for insertion in the outer ears of the head of a subject and means for adjusting said plugs with a parallel motion towards and away from one another, said means comprising at least one elongated side piece connected to one of said plugs and adapted to extend forwardly from the ear, said side piece having a straight edge extending from the center of the plug so that the face bow can be swung about the subject's cephalic axis until the straight edge is in horizontal alignment with the orbitale point, and an adjustable bite piece which can be gripped between the teeth and then clamped in position relatively to the side pieces and ear plugs.

15. A face bow according to claim 14, in which both plugs are rigidly connected to a side piece with a straight edge, the two straight edges lying in a common plane containing the common axis of the plugs.

16. A model unit for producing mouth models for external photography, said unit comprising a face bow according to claim 14, together with a model maker, the model maker comprising a stand having two oppositely directed coaxial holes representing external ears for locating the ear plugs for the face bow, a guide surface lying in a common plane with the common axis of the holes for engaging and locating the straight edge of the face bow when it is swung about the plugs in the holes of the model maker, and mountings for locating two model bases in predetermined positions on the model maker.

17. A model unit according to claim 16, further comprising model bases each consisting of a plate with a complementary mounting for engagement with a corresponding one of the mountings on the model maker to hold the model base in a predetermined position on the model marker, and a portion for positively keying a plaster cast of the upper or lower mouth of the subject on the plate.

18. A model unit according to claim 17, in which the mountings for locating the two model bases in predetermined positions on the model makers comprise wedge shaped tongues on the model maker and complementary wedge shaped sockets in the model bases.

19. A model unit according to claim 17, in which the keying portions of the model base plates are undercut slots extending through the plates.

20. A photographic unit comprising an elongate structure containing means which defines a fixed three dimensional Cartesian reference frame one axis of which is a longitudinal axis of the structure, an adjustable support for locating and orienting a body within the reference frame, an X-ray machine at one end of the structure directed in use along the longitudinal axis towards a body in the reference frame, an optical camera at the other end of the structure directed in the opposite direction along the longitudinal axis towards the body and, between the optical camera and the body a removable X-ray cassette holder for use with the X-ray machine, a removable illuminated diffusing light source to the side of the cassette holder remote from the optical camera but facing towards the optical camera, and a removable square lattice grid which is positively located with its origin on the longitudinal axis and its lines vertical and horizontal in use between an X-ray cassette in the holder and the diffusing light source, the lattice grid providing both a visual object for the optical camera and a radio opaque object for the X-ray machine.

References Cited

UNITED STATES PATENTS

| | | | |
|---|---|---|---|
| 2,032,833 | 3/1936 | Broadbent | 250—50 |
| 2,344,823 | 3/1944 | Landis et al. | 250—65 |
| 2,433,129 | 12/1947 | Land | 250—65 |
| 2,753,460 | 7/1956 | Reed et al. | 250—68 |
| 3,364,352 | 1/1968 | Fry et al. | 250—50 |

OTHER REFERENCES

"A Pinhole Camera Autoradiographic Technique for Encapsulated Irradiated Fuel Specimens," Beck, 1962, pp. 4 to 8, 250–65.

RALPH G. NILSON, Primary Examiner

A. L. BIRCH, Assistant Examiner

U.S. Cl. X.R.

250—50; 356—162

UNITED STATES PATENT OFFICE
CERTIFICATE OF CORRECTION

Patent No. 3,514,606 Dated May 26, 1970

Inventor(s) GRAHAM PETER RABEY

It is certified that error appears in the above-identified patent and that said Letters Patent are hereby corrected as shown below:

In the heading insert:

--Claims priority, application Great Britain, June 2, 1966, 24671/66 --.

SIGNED AND
SEALED
SEP 15 1970

(SEAL)
Attest:

Edward M. Fletcher, Jr.
Attesting Officer

WILLIAM E. SCHUYLER, JR.
Commissioner of Patents